Nov. 16, 1926.
H. W. PLEISTER
1,606,843
TERMINAL BRIDLE RING BRACKET
Filed Nov. 25, 1924    2 Sheets-Sheet 1
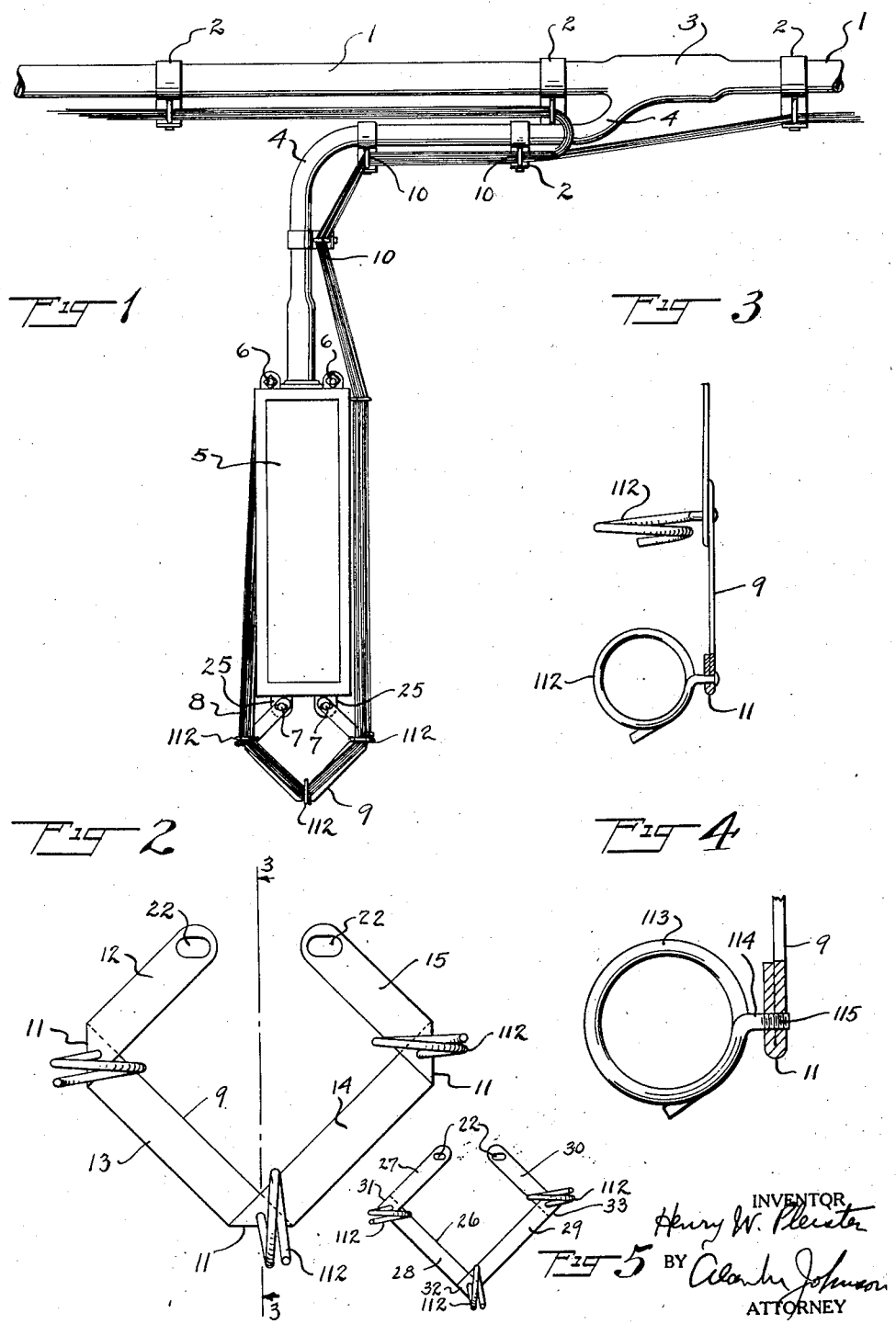

Nov. 16, 1926.                                              1,606,843
              H. W. PLEISTER
        TERMINAL BRIDLE RING BRACKET
            Filed Nov. 25, 1924       2 Sheets-Sheet 2
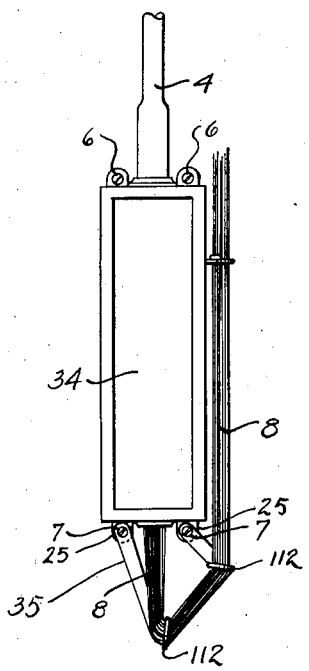
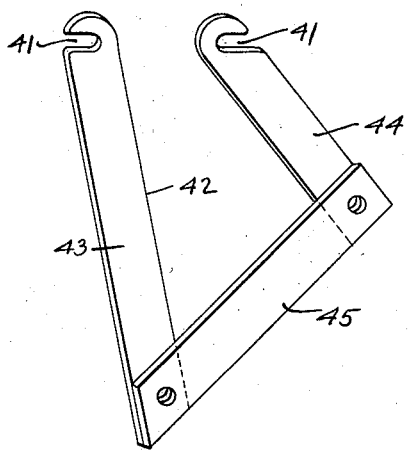
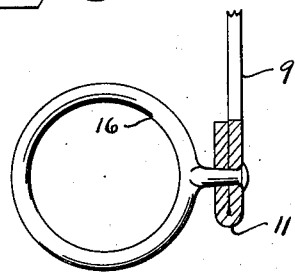
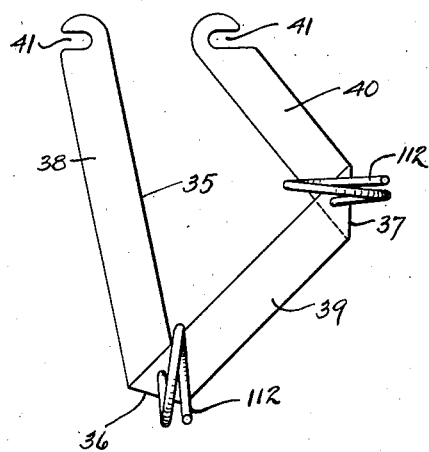
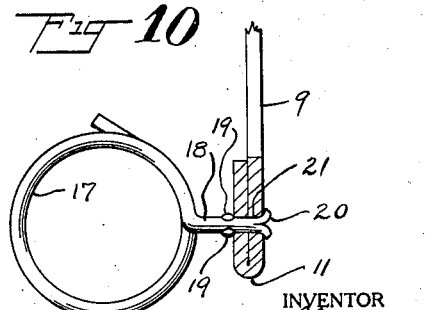

Patented Nov. 16, 1926.

1,606,843

UNITED STATES PATENT OFFICE.

HENRY W. PLEISTER, OF WESTFIELD, NEW JERSEY, ASSIGNOR TO HENRY B. NEWHALL.

TERMINAL BRIDLE-RING BRACKET.

Application filed November 25, 1924. Serial No. 752,279.

My invention relates to the telephone and telegraph art, and more particularly to what is known as interior block distribution.

My invention further relates to a terminal bridle ring bracket, and, also, to the combination of my bracket with a terminal box.

My invention further relates to certain articles of manufacture, combinations and details of construction which will be more fully hereinafter described and pointed out in the claims.

In the acompanying drawings, I have shown, by way of illustration, different forms of my invention, but it is of course to be understood that my invention is not to be confined to the particular forms shown. In these drawings the same reference numerals refer to similar parts in the several figures.

Fig. 1 is a fragmentary front elevation of a portion of an interior block distribution installation showing the main cable, the spliced out cable, a terminal box and runs of bridle wires;

Fig. 2 is a plan view of one form of my improved terminal bridle ring bracket;

Fig. 3 is a vertical section, on the line 3—3 of Fig. 2;

Fig. 4 is a fragmentary vertical section showing a bridle ring screwed into the bracket, at its thickened portion, rather than riveted to it;

Fig. 5 is a plan view of another modification;

Fig. 6 is a fragmentary front elevation of a different form of terminal bridle ring bracket cooperating with a different form of terminal box;

Fig. 7 is a detail plan view of the terminal bridle ring bracket shown in Fig. 6;

Fig. 8 is a perspective view showing a modification;

Fig. 9 is a fragmentary vertical section showing a bridle ring having a closed eye, secured by riveting to the bracket;

Fig. 10 is a vertical section of a modification showing a bridle ring rotatably mounted in the bracket, to permit change in the direction of the bridle wires.

Prior to my invention it was old in interior block distribution to run a cable into a city block, or any other locality, and then splice out of the main cable, an auxiliary or subsidiary cable and connect such auxiliary or subsidiary cable with a terminal box, where the wires are racked and bridle wires are passed out of said terminal box and formed into a bundle, which bundle is passed beneath the box and then up the other side; the bridle wires are then distributed to subscribers.

This requires the use of two or three bridle rings, as the case may be, beneath the terminal box. If the terminal box is mounted on a wall or other suitable masonry support holes have to be drilled in the wall, expansion bolts inserted, and then the bridle rings have to be screwed into the expansion bolts. In case the terminal box is mounted upon a wooden fence or post, it requires that two or more screw-threaded bridle rings be screwed into the wooden wall or post, so as to support and lead the bridle wires after they emerge from the terminal box.

All this requires additional labor and is expensive. It is particularly objectionable in those cases where it is found necessary to replace the fence or pole. It is also objectionable in those instances where it is desirable or necessary to remove the terminal box temporarily from a wall that has to be repaired; for it is impossible to unscrew the bridle rings while the bridle wires are in them, as a proper installation requires that the bridle wires be pulled taut and kept in that condition.

By my invention, I avoid all the unnecessary labor and expense for I support the runs of bridle wires, as they emerge from the terminal box, upon a terminal bridle ring bracket, which is itself supported by the terminal box. By my invention when the terminal box is removed from a wall, fence or pole the terminal bridle ring bracket, which is supported upon it, is also removed.

My terminal bridle ring bracket may be supported in various ways upon the terminal box. By way of example, I preferably support it on the same securing devices which support the terminal box, as will be later more fully hereinafter described and pointed out in the claims.

In the illustrative embodiment of my invention shown in the drawings, 1 is the main cable which is supported upon a wall or any other support by means of the cable clamps 2, 2. At 3 this main cable is spliced, an auxiliary or subsidiary cable 4 being withdrawn from it. This auxiliary cable 4 is supported by similar cable clamps 2, 2, and is connected to the terminal box 5 supported on a wall or other suitable support, by any suitable means such as by the bolts 6, 6 and 7, 7. The wires forming the subsidiary cable 4 are racked out in the usual manner within the terminal box 5. Within the terminal box bridle wires are connected with the wires of the cable and pass out of the side of the terminal box 5, forming a bundle of bridle wires 8 which is supported upon my terminal bridle wire bracket 9, and thence up the other side of the terminal box 5, where the bundle of bridle wires are supported by bridle rings 10, 10 and distributed to subscribers in the well-known manner.

My terminal bridle ring bracket 9 may be variously formed. In the preferred construction, that shown in Figs. 1, 2 and 3, it is formed from a single strip of sheet metal and bent on itself at the points 11, 11 forming the sides 12, 13, 14 and 15. Where the strip of metal is bent upon itself the bracket has a double thickness which is utilized to form a bearing for the bridle rings 112, 112. These bridle rings 112, 112 may be of the open, or pigtail form, and riveted to the bracket as shown in Fig. 3. In some cases, a bridle ring 113 may be used having a shank 114 provided with screw-threads 115 to cooperate with female screw-threads tapped into the thickened portion of the bracket 9, as shown for example in Fig. 4.

In some cases I may use a closed bridle ring 16, as shown in Fig. 9. In other cases, to permit a ready change in the direction of bridle wires 8, I may employ a bridle ring 17 (Fig. 10) which is rotatably mounted in the bracket. This may be accomplished in various ways. In Fig. 10 I have shown, for example, the stem 18 of the bridle ring, provided with lugs 19, 19 which form a shoulder. The inner end of the stem 18 is upset at 20 so as to prevent the withdrawal of the shank 18, and yet permit its rotation within the hole 21 in the bracket 9. It is, of course, to be understood that any one of these different bridle rings may be used in any one of my terminal bridle ring brackets, as found convenient or expedient.

The ends of the sides 12 and 15 (Fig. 2) are provided with engaging means, preferably in the form of elongated holes 22, 22, to cooperate with the bolts 7, 7 which assist in securing the terminal box 5 to the wall or other suitable support. These holes 22 are elongated to permit of ready adjustment. Instead of elongating the holes, slots may be employed as shown in Figs. 7 and 8.

To position my terminal bridle ring bracket it is only necessary to remove the nuts (not shown) from the bolts 7, 7 and slip the bolts 7, 7 through the holes 22, 22; then again secure the nuts on the bolts, which will secure the terminal bridle ring bracket to the terminal box. In some installations where nuts are not used, the bolts would have to be temporarily removed, to permit the holes 22, 22 to register with the holes in the lugs 25, 25 in the terminal box 5, when the bolts would then again be inserted to secure the terminal box and the bracket to the support.

The bundle of bridle wires 8, in the form shown in Figs. 1 and 2, are passed through the three bridle rings 112, 112, on the bridle ring bracket 9 and then up the other side of the terminal box 5 to be distributed as required.

Instead of forming my bracket out of a single piece of sheet metal bent back upon itself, I may, of course, form it out of a plurality of cut and sheared strips of sheet metal and rivet them together as shown in Fig. 5. Here the bracket 26 is formed of the different strips 27, 28, 29 and 30 secured together at the corners 31, 32, 33 preferably by riveting the bridle rings 112, 112 at these points.

In the form of my invention so far described, I have shown a terminal bridle ring bracket cooperating with a terminal box in which the bridle wires are brought out from one side of the terminal box and then passed under and up the other side of the terminal box. With such a terminal box it is desirable to have a bracket having four sides and three bridle rings, as shown in Figs. 1, 2 and 5.

In another type of terminal box 34 the cut-out, or spliced out, auxiliary cable 4 is passed through the top of the terminal box 34 and racked out in the box as usual, but instead of passing the bridle wires out of the side of the box, they are brought down through the center of the box as shown in Fig. 6. With such a terminal box it is not necessary to employ a terminal bridle ring bracket having more than two bridle rings to support and guide the bundle of bridle wires 8.

With such a terminal box I use a modified form of bracket 35, shown in Fig. 7, in which the bracket is formed from a single sheet of metal bent back upon itself at the corners 36, 37 to form the three sides 38, 39 and 40, the two bridle rings 112, 112 being secured at the corners of the bracket as illustrated in this figure. In this construction, to permit ready adjustability, I provide the ends of the sides 38 and 40 with open slots 41, 41 to cooperate with the bolts 7, 7 of the terminal box 34. The bundle of bridle wires first pass through the lower bridle ring 112, and thence through the other bridle ring upon the terminal bridle ring bracket 35 as shown in Fig. 6.

In some instances, I may form a terminal bridle ring bracket 42 out of separate and distinct strips of cut and sheared metal, as shown in Fig. 8, in which the sides 43 and 44 of the bracket are connected by the strip 45, which may be welded, or otherwise secured to the sides 43 and 44. The sides 43 and 44 are provided with open slots 41, 41 to cooperate with the bolts 7, 7 of the terminal box in the manner previously described for the other forms.

Having thus described this invention in connection with illustrative embodiments thereof, to the details of which I do not desire to be limited, what is claimed as new and what is desired to secure by Letters Patent is set forth in the appended claims.

What I claim is:—

1. A new article of manufacture comprising a terminal bridle ring bracket formed from sheet metal bent on itself to form an angular member with overlapping portions to form bridle ring mounts, bridle rings mounted on the overlapping portions, each end of the angular member being provided with an opening to register with the support holes in a terminal box so that the same fastening means which secures the terminal box to a support will secure the terminal bridle ring bracket to the terminal box.

2. A new article of manufacture comprising a terminal bridle ring bracket formed from sheet metal bent on itself to form an angular member having overlapping portions to form bridle ring mounts, bridle rings rotatably mounted on the overlapping portions to permit a change in direction of the bridle wires, each end of the angular member being provided with an opening to register with the support holes in a terminal box so that the same fastening means which secures the terminal box to a support will secure the terminal bridle ring bracket to the terminal box.

HENRY W. PLEISTER.